United States Patent
Miller et al.

(10) Patent No.: US 6,637,570 B2
(45) Date of Patent: Oct. 28, 2003

(54) OVER-RUNNING CLUTCH PULLEY WITH COMPOSITE SEALING MEMBER

(75) Inventors: John Miller, Jackson, MI (US); Randall King, Ann Arbor, MI (US); Bryce Babcock, Saline, MI (US)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 09/997,702

(22) Filed: Nov. 29, 2001

(65) Prior Publication Data

US 2003/0098215 A1 May 29, 2003

(51) Int. Cl.[7] .......................... F16D 41/20; F16D 13/08
(52) U.S. Cl. ...................... 192/41 S; 192/75; 277/572; 277/576
(58) Field of Search ................. 192/41 S, 75; 277/572, 576, 577

(56) References Cited

U.S. PATENT DOCUMENTS

| | | | | |
|---|---|---|---|---|
| 2,766,082 A | * | 10/1956 | Ritchey ....................... 384/484 |
| 3,114,559 A | * | 12/1963 | Miglietti et al. .......... 192/41 S |
| 5,029,689 A | * | 7/1991 | Grimm ....................... 277/572 |
| 5,042,822 A | * | 8/1991 | Dreschmann et al. ....... 277/353 |
| 5,332,232 A | * | 7/1994 | Kurose ..................... 192/41 S |
| 5,472,284 A | * | 12/1995 | Alling et al. ................ 277/152 |
| 5,517,957 A | * | 5/1996 | Wagner et al. ............ 192/41 S |
| 5,598,913 A | | 2/1997 | Monahan et al. |
| 5,645,358 A | * | 7/1997 | Acampora, Jr. ............. 572/572 |
| 5,649,772 A | * | 7/1997 | Schlereth et al. ............. 277/94 |
| 5,975,534 A | * | 11/1999 | Tajima et al. ................ 277/572 |
| 6,394,248 B1 | * | 5/2002 | Monahan et al. ......... 192/41 S |

\* cited by examiner

*Primary Examiner*—Rodney H Bonck
*Assistant Examiner*—Eric M. Williams
(74) *Attorney, Agent, or Firm*—Brinks Hofer Gilson & Lione

(57) ABSTRACT

An over-running clutch pulley of the preferred embodiment includes a sheave member, a hub member located substantially concentrically within the sheave member, a sealing member, and a clutch member, which cooperate to rotationally engage the drive belt and the cylindrical shaft. The sheave member preferably includes a sheave input section adapted to engage the input device, a sheave clutch section defining a sheave clutch surface, and a sheave flange element. Similarly, the hub member preferably includes a hub output section adapted to engage the output device, a hub clutch section defining a hub clutch surface, and a hub lip element. The sealing member preferably includes a seal outer section frictionally engaged with the sheave flange element, and a seal inner section slidably engaged with the hub lip element. The sealing member preferably functions to substantially seal a cavity defined by the sheave flange element and the hub lip element.

22 Claims, 2 Drawing Sheets

OVER-RUNNING CLUTCH PULLEY WITH COMPOSITE SEALING MEMBER

TECHNICAL FIELD

This invention relates generally to devices in the over-running clutch field, and more specifically to an improved over-running clutch pulley for use with an accessory device driven by an automotive engine with a belt drive.

BACKGROUND OF THE INVENTION

During the operation of an automotive engine, a drive belt is typically used to power and operate various accessory devices. One of these accessory devices is typically an automotive alternator, which provides electrical power to the automobile. While several arrangements of drive belts are in use, the serpentine arrangement, which drives several accessory devices, is currently most favored. Serpentine arrangements typically include a drive pulley connected to the crankshaft of the engine (the "output device") and a drive belt trained about the drive pulley. The drive belt is also trained about one or more conventional driven pulleys, which are connected to the input shafts of various accessories devices (the "input device").

Most conventional driven pulleys are made from a one-piece design with no over-running capabilities. In other words, the conventional driven pulleys are rigidly mounted to the input shaft and are incapable of allowing relative rotational movement between any section of the driven pulley and the input shaft. As a result of the lack of any over-running capabilities and of the generation of significant inertia by the accessory, relative slippage between the drive belt and the driven pulley may occur if the drive belt suddenly decelerates relative to the input shaft. The relative slippage may cause an audible squeal, which is annoying from an auditory standpoint, and an undue wear on the drive belt, which is undesirable from a mechanical standpoint.

In a typical driving situation, the drive belt may experience many instances of sudden deceleration relative to the input shaft. This situation may occur, for example, during a typical shift from first gear to second gear under wide open throttle acceleration. This situation is worsened if the throttle is closed or "back off" immediately after the shift. In these situations, the drive belt decelerates very quickly while the driven pulley, with the high inertia from the accessory device, maintains a high rotational speed, despite the friction between the drive belt and the driven pulley.

In addition to the instances of sudden deceleration, the drive belt may experiences other situations that cause audible vibration and undue wear. As an example, a serpentine arrangement with conventional driven pulleys may be used with an automobile engine that has an extremely low idle engine speed (which may increase fuel economy). In these situations, the arrangement typically experiences "belt flap" of the drive belt as the periodic cylinder firing of the automotive engine causes the arrangement to resonate within a natural frequency and cause an audible vibration and an undue wear on the drive belt.

The disadvantage of the conventional driven pulleys, namely the audible squeal, the undue wear, and the vibration of the drive belt, may be avoided by the use of an over-running clutch pulley instead of the conventional driven pulley. An over-running clutch pulley allows the pulley to continue to rotate at the same rotational speed and in a same rotational direction after a sudden deceleration of the drive belt. In a way, the over-running clutch pulley functions like the rear hub of a typical bicycle; the rear hub and rear wheel of a conventional bicycle continue to rotate at the same rotational speed and in the same rotational direction even after a sudden deceleration of the pedals and crankshaft of the bicycle. An example of an over-running clutch pulley is described in U.S. Pat. No. 5,598,913 issued to the same assignee of this invention and hereby incorporated in its entirety by this reference.

Since many customers of new automobiles are demanding longer lives, with relatively fewer repairs, for their new automobiles, there is a need in the automotive field, if not in other fields, to create an over-running clutch pulley with increased wear resistance. This invention provides an over-running clutch pulley with a closed clutch cavity and a composite sealing member, which is intended to increase wear resistance while minimizing the costs and weight.

DETAILED DESCRIPTION OF PREFERRED EMBODIMENT

The following description of the preferred embodiment of the invention is not intended to limit the scope of this invention to the preferred embodiment, but rather to enable any person skilled in the art of over-running clutches to make and use this invention.

Figure 1:
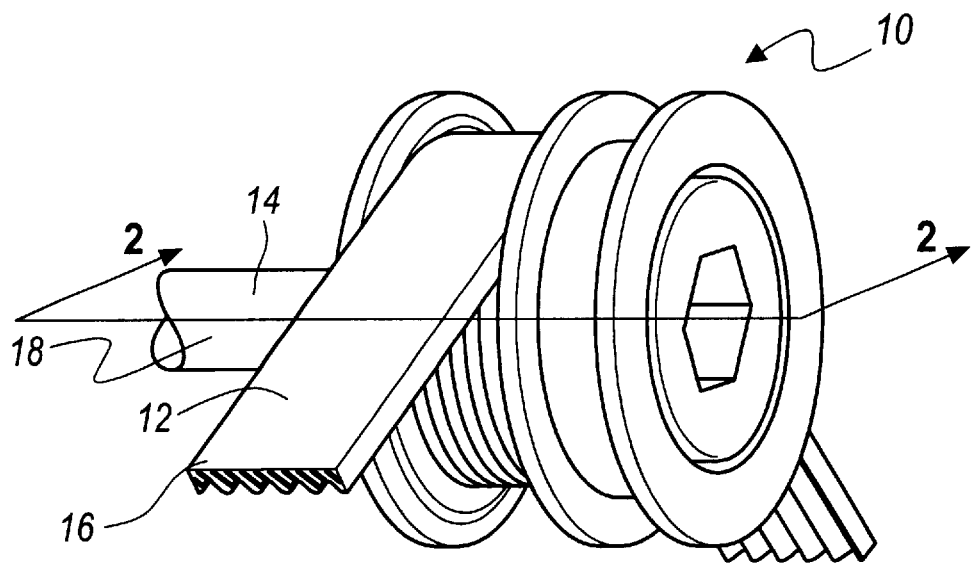
FIG. 1 is a perspective view of an over-running clutch pulley of the invention, shown with a drive belt as the input device and a cylindrical shaft as the output device.

As shown in FIG. 1, the invention includes an over-running clutch pulley 10 for rotationally engaging an input device 12 and an output device 14. The over-running clutch pulley 10 has been designed for use with a drive belt 16 as the input device 12, and with a cylindrical shaft 18 as the output device 14. More specifically, the over-running clutch pulley 10 has been particularly designed for use with a drive belt 16 with a grooved surface and a cylindrical shaft 18 of an automotive alternator. The over-running clutch pulley 10 may be used, however, in other environments, with other suitable input devices, such as smooth belt, a toothed belt, a V-shaped belt, or even a toothed gear, and with other suitable output devices, such as a polygonal shaft. Furthermore, the over-running clutch pulley 10 may be used in an environment with two devices that alternate their rotational input responsibilities, and in an environment with an "output device" that actually provides rotational input and with an "input device" that actually receives rotational input. In these alternative embodiments, the terms "input device" and "output device" are interchangeable.

Figure 2:
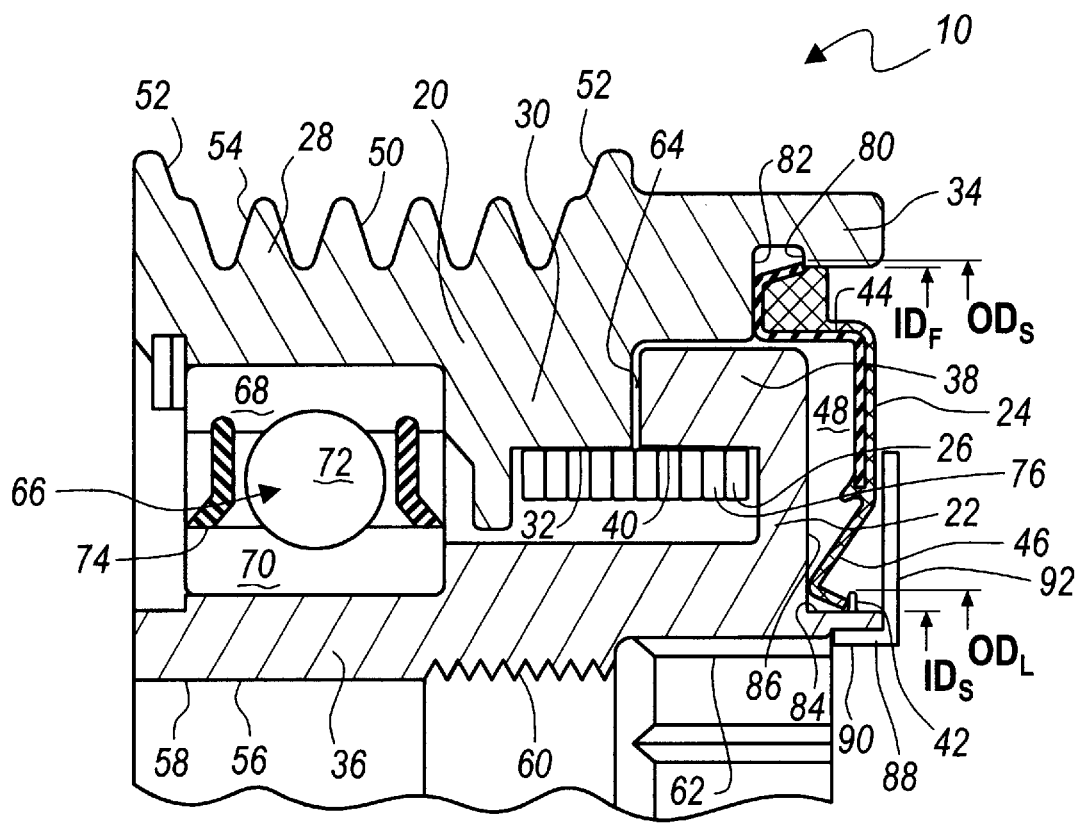
FIG. 2 is a partial cross-section view, taken along the line 2—2 of FIG. 1, of the over-running clutch pulley of the preferred embodiment.

As shown in FIG. 2, the over-running clutch pulley 10 of the preferred embodiment includes a sheave member 20, a hub member 22 located substantially concentrically within the sheave member 20, a sealing member 24, and a clutch member 26, which cooperate to rotationally engage the drive belt and the cylindrical shaft. The sheave member 20 preferably includes a sheave input section 28 adapted to engage the input device, a sheave clutch section 30 defining a sheave clutch surface 32, and a sheave flange element 34. Similarly, the hub member 22 preferably includes a hub output section 36 adapted to engage the output device, a hub clutch section 38 defining a hub clutch surface 40, and a hub lip element 42. The sealing member 24 preferably includes a seal outer section 44 frictionally engaged with the sheave flange element 34, and a seal inner section 46 slidably engaged with the hub lip element 42. The sealing member 24 preferably functions to substantially seal a cavity 48 defined by the sheave flange element 34 and the hub lip element 42 to increase wear resistance of the over-running clutch pulley 10 while minimizing cost and weight.

The sheave input section 28 of the sheave member 20 of the preferred embodiment functions to engage the drive belt. To substantially prevent rotational and axial slippage of the sheave member 20 and the drive belt, the sheave input section 28 preferably defines a sheave input surface 50 with two sheave input shoulders 52 and at least one sheave input groove 54. The sheave input section 28 may alternatively define other suitable surfaces, such as toothed surfaces or ribbed surfaces, to engage the input device. The sheave input surface 50 is preferably outwardly directed (away from the rotational axis of the over-running clutch pulley 10) and is preferably substantially cylindrically shaped. The sheave input section 28 is preferably made from conventional structural materials, such as steel, and with conventional methods, but may alternatively be made from other suitable materials and from other suitable methods.

The hub output section 36 of the hub member 22 of the preferred embodiment functions to engage the cylindrical shaft. The hub output section 36 preferably defines a hub output surface 56 with a smooth section 58 (which functions to ease and center the assembly of the over-running clutch pulley 10 onto the cylindrical shaft), a threaded section 60 (which functions to substantially prevent rotation and to axially retain the hub member 22 to the cylindrical shaft), and a hub attachment section 62 preferably hexagonal to mate with an alien wrench for easy tightening and loosening of the over-running clutch pulley 10 onto and off of the cylindrical shaft). Of course, the hub output section 36 may include other suitable devices or define other surfaces to prevent rotational and axial slippage, to engage the cylindrical shaft, and to engage a tool for tightening or loosening the over-running clutch pulley 10 onto and off of the cylindrical shaft. The hub output surface 56 is preferably inwardly directed (toward the rotational axis of the over-running clutch pulley 10) and is preferably substantially cylindrically shaped. The hub output section 36 is preferably made from conventional structural materials, such as steel, and with conventional methods, but may alternatively be made from other suitable materials and from other suitable methods.

The sheave clutch section 30 and the hub clutch section 38 of the preferred embodiment function to provide the sheave clutch surface 32 and the hub clutch surface 40, respectively, for the engagement with the clutch member 26. The sheave clutch section 30 preferably extends radially inward from the sheave member 20. In this manner, the sheave clutch section 30 is preferably made from the same material and with the same methods as the sheave input section 28, but may alternatively be made from other suitable materials and with other suitable methods. The hub clutch section 38 preferably extends radially outward from and axially over the hub output section 36. In this manner, the hub clutch section 38 is preferably made from the same material and with the same methods as the hub output section 36, but may alternatively be made from other suitable materials and with other suitable methods.

In the preferred embodiment, the sheave clutch surface 32 and the hub clutch surface 40 are located substantially adjacent with an axial gap 64 between each other. The sheave clutch surface 32 and the hub clutch surface 40 are preferably inwardly directed (toward the rotational axis of the over-running clutch pulley 10) and are preferably substantially cylindrically shaped. Furthermore, the sheave clutch surface 32 and the hub clutch surface 40 preferably have a similar radial diameter, a similar axial length, and a similar smooth finish. These features allow optimum performance of the clutch member 26. The sheave clutch surface 32 and the hub clutch surface 40 may alternatively have differences with each other on these, or other, design specifications.

In the preferred embodiment, the over-running clutch pulley 10 also includes a bearing member 66, which is preferably located between the sheave member 20 and the hub member 22. The bearing member 66 preferably functions to allow relative rotational movement of the sheave member 20 and the hub member 22. The bearing member 66, which is preferably a rolling element type, preferably includes an outer race element 68 preferably press-fit mounted on the sheave member 20, an inner race element 70 preferably press-fit mounted on the hub member 22, ball bearing elements 72 preferably located between the outer race element 68 and the inner race element 70, and bearing seals 74 preferably extending between the outer race element 68 and the inner race element 70 on either side of the ball bearing elements 72. The bearing member 66 may alternatively be of other suitable types, such as a journal bearing or a roller bearing. The bearing member 66 is a conventional device and, as such, is preferably made from conventional materials and with conventional methods, but may alternatively be made from other suitable materials and with other suitable methods.

The clutch member 26 of the preferred embodiment functions to engage the sheave clutch surface 32 and the hub clutch surface 40 upon the acceleration of the sheave member 20 in a first rotational direction relative to the hub member 22, and to disengage the sheave clutch surface 32 and the hub clutch surface 40 upon the deceleration of the sheave member 20 in the first rotational direction relative to the hub member 22. In the preferred embodiment, the clutch member 26 is a coil spring 76. The coil spring 76, which is made from conventional materials and with conventional methods, accomplishes the above features by the particular size and orientation of the coil spring 76. In alternative embodiments, the clutch member 26 may include other suitable devices that accomplish the above features.

The coil spring 76 is preferably designed with a relaxed spring radial diameter that is sized slightly greater than an inner diameter of the sheave clutch surface 32 and the hub clutch surface 40. Thus, when experiencing no rotational movement of the sheave member 20 or the hub member 22, the coil spring 76 frictionally engages with and exerts an outward force on both the sheave clutch surface 32 and the hub clutch surface 40. Further, the coil spring 76 is preferably oriented such that the coils extend axially in the first rotational direction from the sheave clutch surface 32 to the hub clutch surface 40. With this orientation, relative rotational movement of the sheave member 20 and the hub member 22 will result in an unwinding or winding of the clutch member 26. In other words, acceleration of the sheave member 20 in the first rotational direction relative to the hub member 22 will bias an unwinding of the coil spring 76 and deceleration of the sheave member 20 in the first rotational direction relative to the hub member 22 will bias a winding of the coil spring 76.

The unwinding of the coil spring 76 tends to increase the outward force of the coil spring 76 on the sheave clutch surface 32 and the hub clutch surface 40, thereby providing engagement, or "lock", of the sheave member 20 and the hub member 22. This engagement condition preferably occurs upon the acceleration of the sheave member 20 in the first rotational direction relative to the hub member 22. On the other hand, the winding of the coil spring 76 tends to decrease the outward force of the coil spring 76 on the sheave clutch surface 32 and the hub clutch surface 40, thereby allowing disengagement, or "slip", of the sheave member 20 and the hub member 22. This disengagement condition preferably occurs upon the deceleration of the sheave member 20 in the first rotational direction relative to the hub member 22.

The sealing member 24 of the preferred embodiment functions to substantially seal the cavity 48 defined by the sheave flange element 34 and the hub lip element 42. The sealing member 24 preferably accomplishes this function with the seal outer section 44, which is frictionally engaged with the sheave member 20, and the seal inner section 46, which is slidably engaged with the hub member 22. The sealing member 24, of course, may alternatively use other devices or methods, either in combination or substitution, to frictionally engage the sheave member 20 and slidably engage the hub member 22.

The seal outer section 44 of the sealing member 24 of the preferred embodiment defines a seal outer diameter $OD_S$ greater than a flange inner diameter $ID_F$ defined by the sheave flange element 34, which preferably enhances the engagement of the sealing member 24 with the sheave member 20. The seal outer section 44 is preferably made from a structural material that allows enough deflection to pass the seal outer section 44 under the sheave flange element 34 during attachment of the sealing member 24 to the sheave member 20, and that allows enough rebound to frictionally engage the sheave flange element 34 after the attachment and during use of the over-running clutch pulley 10. Although the sealing member 24 may be made from any suitable material and with any suitable method, the seal outer section 44 is preferably made from a thin metallic material, such as steel, and with conventional methods.

In the preferred embodiment, the sheave flange element 34 of the sheave member 20 defines a flange inboard surface 80 and another section of the sheave member 20 defines a sheave outboard surface 82 substantially opposite the flange inboard surface 80. The seal outer section 44 of the preferred embodiment frictionally engages the sheave member 20 at the flange inboard surface 80 and at the sheave outboard surface 82, which preferably enhances the sealing of the sealing member 24 against the sheave member 20. The seal outer section 44 may, however, be frictionally engaged to the sheave member 20 at only one location, or at more than two locations.

Figure 3:
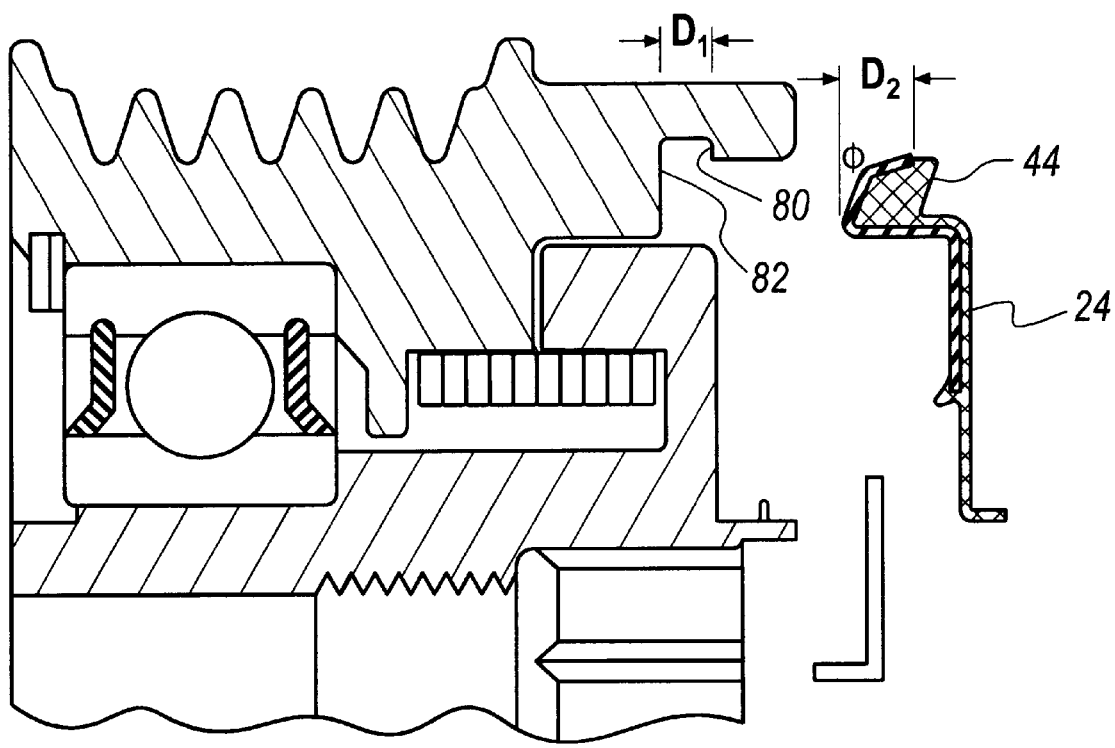
FIG. 3 is a partial cross-section view, similar to FIG. 2, of the over-running clutch pulley shown before attachment of the sealing member.

As shown in FIG. 3, the flange inboard surface 80 and the sheave outboard surface 82 preferably define a first depth $D_1$, while the seal outer section 44 preferably defines a second depth $D_2$. Before attachment of the sealing member 24 to the sheave member 20, the second depth $D_2$ of the sealing member 24 is preferably greater than the first depth $D_1$. Further, the sealing member 24 preferably includes a relatively small angle $\phi$, preferably about 15°. During the attachment of the sealing member 24 to the sheave member 20, the angle $\phi$ preferably collapses to about 0°. The reduction of the depth $D_2$ and the angle $\phi$ preferably pre-loads the sealing member 24 against the flange inboard surface 80 and the sheave outboard surface 82, which preferably further enhances the frictional engagement of the sealing member 24 against the sheave member 20. The sealing member 24, of course, may be alternatively made with any suitable depth and with any suitable angle, such that the general functions of frictional engagement and sealing are accomplished.

As shown in FIG. 2, the inner seal section of the sealing member 24 of the preferred embodiment defines a seal inner diameter $ID_S$ less than a lip outer diameter $OD_L$ defined by the hub lip element 42, which preferably enhances the engagement of the sealing member 24 with the hub member 22. The seal inner section 46 is preferably made from an elastic material that allows enough deflection to pass the seal inner section 46 over the hub lip element 42 during attachment of the sealing member 24 to the hub member 22, and that allows slidable engagement with the hub lip element 42 after the attachment and during use of the over-running clutch pulley 10. Although the sealing member 24 may be made from any suitable material and with any suitable method, the seal inner section 46 is preferably made from a rubber-like material, such as nitrile, polyacrylic, silicone, or other suitable material, and with conventional methods. In this manner, the sealing member 24 is preferably made from two different materials; one material in the seal outer section 44 that allows deflection and frictional engagement with the sheave member, and one material in the inner seal section that allows slidable engagement with the hub member 22. To connect the two materials and to form the sealing member 24, the elastic material is preferably molded over portions of the seal outer section 44. In this manner, the elastic material also functions to assist the "rebound" of the seal outer section 44 during attachment. The sealing member 24 may alternatively be made from only one, or more than two suitable materials and can be connected with any suitable method or device.

In the preferred embodiment, the hub member 22 defines a hub axial surface 84 and a hub outboard surface 86, preferably perpendicular to the hub axial surface 84. Although the hub axial surface 84 preferably supports the hub lip element 42, any other suitable surface or device may support the hub lip element 42. The seal inner section 46 of the preferred embodiment slidably engages the hub member 22 at the hub lip element 42 and at the hub outboard surface 86, which preferably enhances the sealing of the sealing member 24 against the hub member 22. The seal inner section 46 may, however, be slidably engaged to the hub member 22 at only one location, or at two or more locations.

In the preferred embodiment, as shown in FIG. 2, the over-running clutch pulley 10 also includes a slinger member 88, which is preferably mounted to the hub member 22 opposite the hub axial surface 84. The slinger member 88 functions to provide additional sealing protection for the cavity 48. The slinger member 88 preferably includes a base portion 90 mounted to the hub member 22 and an extension portion 92 extending radially outward. The slinger member 88 is preferably attached to hub member 22 before the over-running clutch pulley 10 is fastened to an output device. For this reason, the slinger member 88 is preferably designed to not interfere with or cover the hub attachment section 62. The slinger member 88 may alternatively be designed to be attached to the hub member 22 after the over-running clutch pulley 10 is fastened to an output device. With this variation, the slinger member 88 may be designed to additionally protect and seal the hub output section 36. Preferably, the slinger member 88 is made from a plastic material, but alternatively, the slinger member 88 may be made from any suitable material.

As any person skilled in the art of over-running clutches will recognize from the previous detailed description and from the figures and claims, modifications and changes can be made to the preferred embodiment of the invention without departing from the scope of this invention defined in the following claims.

What is claimed is:

1. An over-running clutch pulley for rotationally engaging an input device and an output device, comprising:

a sheave member including a sheave input section adapted to engage the input device, a sheave clutch section extending radially inward from said sheave input section and defining a sheave clutch surface, and a sheave flange element extending radially inward and defining a flange inner diameter;

a hub member located substantially concentrically within said sheave member and including a hub output section adapted to engage the output device, a hub clutch section extending radially outward from and axially over said hub output section and defining a hub clutch surface substantially adjacent said sheave clutch surface, and a hub lip element extending radially outward and defining a lip outer diameter, wherein said sheave flange element and said hub lip element cooperate to define a cavity;

a sealing member having a seal outer section and a seal inner section, said seal outer section defining a seal outer diameter greater than said flange inner diameter and being frictionally engaged with said sheave flange element, said seal inner section defining a seal inner diameter less than said lip outer diameter and being slidably engaged with said hub lip element, wherein said sealing member is adapted to substantially seal said cavity;

a clutch member located within said closed clutch cavity and adapted to engage said sheave clutch surface and said hub clutch surface upon the acceleration of said sheave member in a first rotational direction relative said hub member, and to disengage said sheave clutch surface and said hub clutch surface upon the deceleration of said sheave member in the first rotational direction relative said hub member; and a slinger member having a base portion mounted to said hub member and an extension portion extending radially outward and providing additional sealing protection for said cavity.

2. The over-running clutch pulley of claim 1 wherein said sheave flange element defines a flange inboard surface and wherein said sheave member defines a sheave outboard surface substantially opposite said flange inboard surface, and wherein said seal outer section frictionally engages said sheave member at said flange inboard surface and at said sheave outboard surface.

3. The over-running clutch pulley of claim 1 wherein said hub member defines a hub outboard surface, and wherein said seal inner section slidably engages said hub member at said hub lip element and at said hub outboard surface.

4. The over-running clutch pulley of claim 1 wherein said sheave clutch surface is inwardly directed and substantially cylindrically shaped, and wherein said hub clutch surface is inwardly directed and substantially cylindrically shaped.

5. The over-running clutch pulley of claim 1 further comprising a bearing member located between said sheave member and said hub member and adapted to allow relative rotational movement of said sheave member and said hub member.

6. The over-running clutch pulley of claim 1, further comprising a hub axial projection connected to said hub member and having an outer surface and an inner surface, wherein said hub lip element extends from said outer surface of said hub axial projection and said slinger member is coupled to said inner surface of said hub axial projection.

7. The over-running clutch pulley of claim 1, wherein said seal inner section is adapted to deflection past said hub lip element during attachment of said sealing member to said hub member.

8. An over-running clutch pulley for rotationally engaging an input device and an output device, comprising:

a sheave member including a sheave input section adapted to engage the input device, a sheave clutch section extending radially inward from said sheave input section and defining a sheave clutch surface, and a sheave flange element extending radially inward;

a hub member located substantially concentrically within said sheave member and including a hub output section adapted to engage the output device, a hub clutch section extending radially outward from and axially over said hub output section and defining a hub clutch surface substantially adjacent said sheave clutch surface, and a hub lip element extending radially outward, wherein said sheave flange element and said hub lip element cooperate to define a cavity;

a sealing member having a seal outer section made from a structural material and a seal inner section made from an elastic material, said seal outer section being frictionally engaged with said sheave flange element, said seal inner section being slidably engaged with said hub lip element, wherein said sealing member is adapted to substantially seal said cavity; and a clutch member located within said closed clutch cavity and adapted to engage said sheave clutch surface and said hub clutch surface upon the acceleration of said sheave member in a first rotational direction relative said hub member, and to disengage said sheave clutch surface and said hub clutch surface upon the deceleration of said sheave member in the first rotational direction relative said hub member, a slinger member having a base portion mounted to the hub member and an extension portion extending radially outward and providing additional sealing protection for said cavity.

9. The over-running clutch pulley of claim 8 wherein said sheave flange element defines a flange inboard surface and wherein said sheave member defines a sheave outboard surface substantially opposite said flange inboard surface, and wherein said seal outer section frictionally engages said sheave member at said flange inboard surface and at said sheave outboard surface.

10. The over-running clutch pulley of claim 8 wherein said hub member defines a hub outboard surface, and wherein said seal inner section slidably engages said hub member at said hub lip element and at said hub outboard surface.

11. The over-running clutch pulley of claim 8 wherein said sheave clutch surface is inwardly directed and substantially cylindrically shaped, and wherein said hub clutch surface is inwardly directed and substantially cylindrically shaped.

12. The over-running clutch pulley of claim 8 further comprising a bearing member located between said sheave member and said hub member and adapted to allow relative rotational movement of said sheave member and said hub member.

13. The over-running clutch pulley of claim 8, further comprising a hub axial projection connected to said hub member and having an outer surface and an inner surface, wherein said hub lip element extends from said outer surface of said hub axial projection and said slinger member is coupled to said inner surface of said hub axial projection.

14. The over-running clutch pulley of claim 8, wherein said seal inner section is adapted to deflection past said hub lip element during attachment of said sealing member to said hub member.

15. An over-running clutch pulley for rotationally engaging an input device and an output device, comprising:

a sheave member including a sheave input section adapted to engage the input device, a sheave clutch section extending radially inward from said sheave input section and defining a sheave clutch surface, and a sheave flange element extending radially inward and defining a flange inner diameter;

a hub member located substantially concentrically within said sheave member and including a hub output section adapted to engage the output device, a hub clutch section extending radially outward from and axially over said hub output section and defining a hub clutch surface substantially adjacent said sheave clutch surface, and a hub lip element extending radially outward and defining a lip outer diameter, wherein said sheave flange element and said hub lip element cooperate to define a cavity;

a sealing member having a seal outer section and a seal inner section, said seal outer section defining a seal outer diameter greater than said flange inner diameter and being made from a structural material which allows deflection past said sheave flange element during attachment of said sealing member to said sheave member and allows frictionally engagement with said sheave flange element during use of said over-running clutch pulley, said seal inner section defining a seal inner diameter less than said lip outer diameter and being made from an elastic material which allows slidable engagement with said hub lip element, wherein said sealing member is adapted to substantially seal said cavity; and a clutch member located within said closed clutch cavity and adapted to engage said sheave clutch surface and said hub clutch surface upon the acceleration of said sheave member in a first rotational direction relative said hub member, and to disengage said sheave clutch surface and said hub clutch surface upon the deceleration of said sheave member in the first rotational direction relative said hub member; and a slinger member having a base portion mounted to said hub member and an extension portion extending radially outward and providing additional sealing protection for said cavity.

16. The over-running clutch pulley of claim 15 wherein said sheave flange element defines a flange inboard surface and wherein said sheave member defines a sheave outboard surface substantially opposite said flange inboard surface, and wherein said seal outer section frictionally engages said sheave member at said flange inboard surface and at said sheave outboard surface.

17. The over-running clutch pulley of claim 16 wherein said flange outboard surface and said sheave inboard surface define a first depth, wherein said seal outer section defines a second depth, wherein said second depth is greater than said first depth before the attachment of said sealing member to said sheave member.

18. The over-running clutch pulley of claim 15 wherein said hub member defines a hub outboard surface, and wherein said seal inner section slidably engages said hub member at said hub lip element and at said hub outboard surface.

19. The over-running clutch pulley of claim 15 wherein said sheave clutch surface is inwardly directed and substantially cylindrically shaped, and wherein said hub clutch surface is inwardly directed and substantially cylindrically shaped.

20. The over-running clutch pulley of claim 15 further comprising a bearing member located between said sheave member and said hub member and adapted to allow relative rotational movement of said sheave member and said hub member.

21. The over-running clutch pulley of claim 15, further comprising a hub axial projection connected to said hub member and having an outer surface and an inner surface, wherein said hub lip element extends from said outer surface of said hub axial projection and said slinger member is coupled to said inner surface of said hub axial projection.

22. The over-running clutch pulley of claim 15, wherein said seal inner section is adapted to deflection past said hub lip element during attachment of said sealing member to said hub member.

* * * * *